April 22, 1952     F. J. BUSHER     2,594,120
FLOAT AND LINE RETRIEVER
Filed July 2, 1951
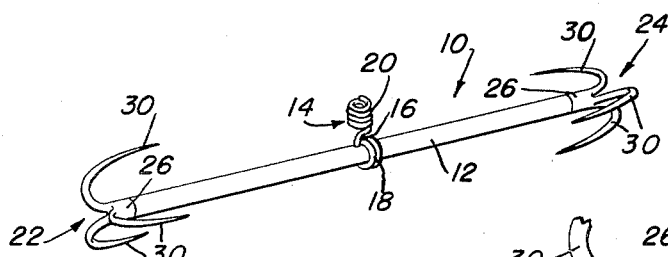
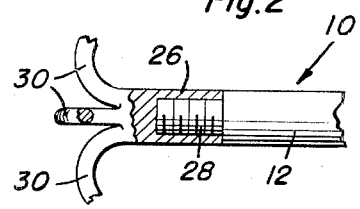
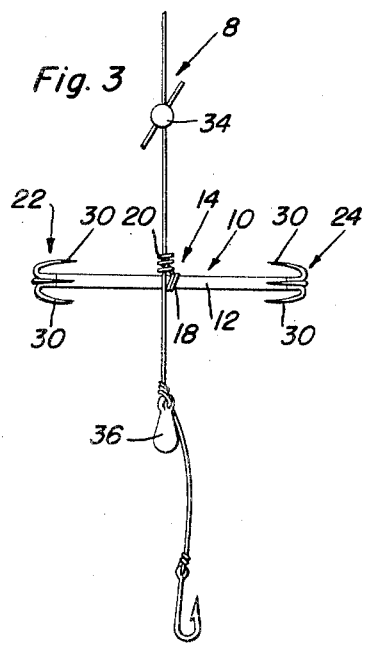
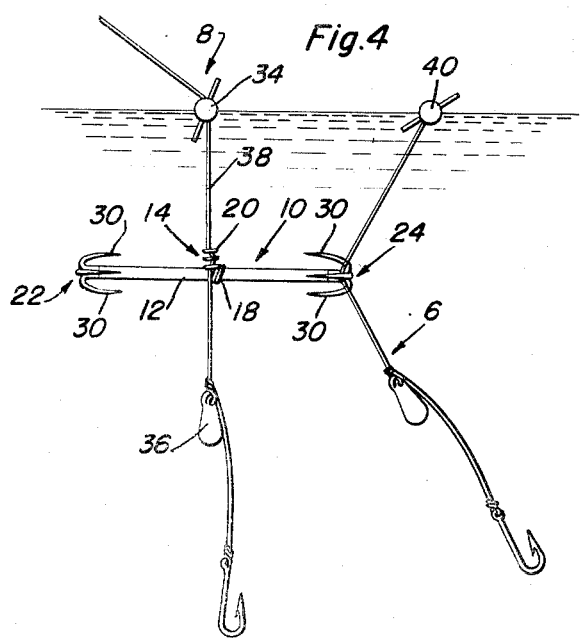
Frank J. Busher
INVENTOR.

Patented Apr. 22, 1952

2,594,120

UNITED STATES PATENT OFFICE 2,594,120

FLOAT AND LINE RETRIEVER

Frank J. Busher, Newport, Ky.

Application July 2, 1951, Serial No. 234,847

2 Claims. (Cl. 43—17.2)

1

The present invention relates to improved ways and means enabling a fisherman to conveniently and satisfactorily retrieve a loose fishing line and float as well as the usual sinker and fishook carried by said line.

The problem of recovering broken fishing lines is one which consumes valuable time and often exhausts the patience of the one who is called upon to cope with the problem. It is a matter of common knowledge that valuable fully equipped fishing lines break, for one reason or another, and such means as is usually available to assist one in the recovery work is generally inadequate. It is, therefore, the object of the present invention to provide a simple, practical and efficient instrumentality which may be readily attached to a supplementary fishing line and then may be brought into play in a manner to catch hold of and retrieve what might otherwise become a wholly lost line.

Novelty is predicated on a conveniently usable and efficient instrumentality having devices or means at opposite ends for grappling and catching hold of the broken fishing line. Means is also provided at the central or intermediate portion of the instrumentality whereby it may be adjustably and detachably connected with a supplementary or so-called retrieving line. Then, too, novelty is predicated on said instrumentality in combination with said supplementary line.

More specifically, the essence of the invention has to do with an elongated stick or rod member which is of a length to be conveniently carried in one's tackle box. This has grappling and line retrieving devices at its opposite ends, these being preferably in the form of detachable claws. And, means is provided at the center of the rod to permit the latter to be readily attached and frictionally held on the supplementary line in such a way that the rod may whirl or otherwise turn to bring the grappling devices into pickup and retrieving relationship in respect to the free line.

Other objects and advantages will become more readily apparent from the following description and the accompanying sheet of illustrative drawings.

In the drawings:

Figure 1 is a perspective view of the aforementioned retrieving instrumentality showing what is a preferred construction of the same.

Figure 2 is an enlarged fragmentary view with parts in section and elevation illustrating the details of construction.

2

Figure 3 is an elevational view showing said instrumentality in position ready for use on the stated supplementary fishing line.

Figure 4 is a view showing the manner in which the invention is used in the retrieving and recovery work.

In Figure 4 the loose or broken line, the one which is to be retrieved and recovered is denoted by the numeral 6. The supplementary line, which is a conventional one, is denoted by the numeral 8, and the retriever, as a single instrumentality or device, is denoted by the numeral 10. The latter is shown in Figure 1 and comprises a rod or stick 12. This is preferably a thin element and of a length that it may be conveniently carried in the user's tackle box (not shown). The means for temporarily and detachably connecting the retriever 10 with the supplementary line 8 is denoted at 14. While this may be of some other construction than shown, it is preferably a length of wire of appropriate gauge 16 having one end coiled tightly and secured about the intermediate portion of the rod as at 18. The opposite end of the wire is coiled upon itself to provide what is sometimes referred to as a pig-tail coil assembly 20. The coils are adapted to be twisted around and frictionally and detachably connected with the supplementary line in the manner shown. The grappling devices at opposite or outer ends of the rod are of duplicate construction. These devices are denoted by the numerals 22 and 24. Each device comprises an internally threaded socket member 26 (see Figure 2) which is screwed onto a screw-threaded reduced shank 28 on the adjacent end of the rod. The socket member is provided with pointed and hooked tines constituting grappling and retrieving fingers or hooks 30. The casting type supplementary line 8 is equipped with a float 34 and a sinker 36 at a point spaced longitudinally from the float. The retriever 10 is adapted to be frictionally and detachably connected to that portion 38 of the supplementary line between the float 34 and sinker 36. Thus, in practice, the pig-tail coil means 20 is threaded or screwed on the line permitting the stick or rod to take a position at approximate right angles to the axis of the line. The stick, however, is relatively free and may twist and turn and angle itself in indeterminate ways.

The assemblage is made up in the manner shown in Figure 3 and the supplementary line is cast overboard within the vicinity of the lost or broken line 6. By maneuvering and manipulating the supplementary line within the vicinity of the float 40 on the fishing line 6, the claws or hooks will eventually catch hold of said line 6 and it may then be pulled or reeled in an obvious manner.

It is believed that persons skilled in the art to which the invention relates will fully understand the construction, mode of use and usefulness of the same after having made a comprehensive survey of the description in conjunction with the illustrative drawings.

Having described the invention, what is claimed as new is:

1. A fishing line retriever of the class described comprising a linearly straight rigid rod of a length susceptible of being stored and carried in a conventional tackle box, the opposite ends of said rod being reduced and screw-threaded, and a pair of duplicate line grappling devices, each device embodying an axial socket member screwed on the coacting screw-threaded end of said rod, said socket member being provided with radial pointed hooks constituting grappling tines, and means on the intermediate portion of said rod for detachably connecting the same to a fishing line.

2. A fishing line retriever of the class described comprising a linearly straight rigid rod of a length susceptible of being stored and carried in a conventional tackle box, the opposite ends of said rod being reduced and screw-threaded, and a pair of duplicate line grappling devices, each device embodying an axial socket member screwed on the coacting screw-threaded end of said rod, said socket member being provided with radial pointed hooks constituting grappling tines, and means on the intermediate portion of said rod for detachably connecting the same to a fishing line, said means embodying a length of wire having one end coiled and secured tightly about the rod and having its opposite end coiled to provide the convolutions for detachable frictional association with a casting line.

FRANK J. BUSHER.

REFERENCES CITED

The following references are of record in the file of this patent:

UNITED STATES PATENTS

| Number | Name | Date |
|---|---|---|
| 1,227,325 | Schilling | May 22, 1917 |
| 1,251,810 | Oehler | Jan. 1, 1918 |
| 1,334,839 | Cole | Mar. 23, 1920 |
| 1,720,287 | Moore | July 9, 1929 |
| 1,858,941 | Salmon | May 17, 1932 |
| 2,274,380 | Pool | Feb. 24, 1942 |
| 2,514,527 | Verhota | July 11, 1950 |
| 2,522,692 | Speer | Sept. 19, 1950 |